(12) United States Patent
Hashii et al.

(10) Patent No.: US 10,748,246 B2
(45) Date of Patent: Aug. 18, 2020

(54) IMAGE PROCESSING METHOD WITH PREDETERMINED BITMAP FORMATTING, AND IMAGE PROCESSING APPARATUS AND STORAGE MEDIUM THEREWITH

(71) Applicant: CANON KABUSHIKI KAISHA, Tokyo (JP)

(72) Inventors: Yusuke Hashii, Tokyo (JP); Yuta Ikeshima, Kawasaki (JP); Ryosuke Iguchi, Inagi (JP); Shinjiro Hori, Yokohama (JP); Manabu Yamazoe, Tokyo (JP); Akitoshi Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 15/822,660

(22) Filed: Nov. 27, 2017

(65) Prior Publication Data
US 2018/0174271 A1 Jun. 21, 2018

(30) Foreign Application Priority Data

Dec. 16, 2016 (JP) .................................. 2016-244554

(51) Int. Cl.
*G06T 3/40* (2006.01)
*H04N 1/64* (2006.01)
*G06T 7/90* (2017.01)
*G06T 1/00* (2006.01)
(Continued)

(52) U.S. Cl.
CPC .......... *G06T 3/4015* (2013.01); *G06T 1/0007* (2013.01); *G06T 7/13* (2017.01); *G06T 7/90* (2017.01); *H04N 1/4053* (2013.01); *H04N 1/64* (2013.01); *G06T 2207/10024* (2013.01)

(58) Field of Classification Search
None
See application file for complete search history.

(56) References Cited

U.S. PATENT DOCUMENTS 5,613,053 A * 3/1997 Albers .................. G06T 11/203
345/443
5,684,895 A * 11/1997 Harrington ............... G06T 9/00
345/545
(Continued)

FOREIGN PATENT DOCUMENTS

JP H10-240482 9/1998

*Primary Examiner* — Kevin Ky
(74) *Attorney, Agent, or Firm* — Venable LLP

(57) ABSTRACT

An object of the present invention is to implement a bit pattern capable of specifying a plurality of colors while storing information on a shape. The present invention is an image processing apparatus that converts image data in a bitmap format into data including a bit pattern, the apparatus including: a creation unit configured to create, based on pixel values of pixels within an image area of a predetermined size within the image data, the bit pattern storing shape information on the image area, which specifies to which of a plurality of kinds of pixel each pixel within the image area corresponds, and color information on the image area, which specifies a number of colors in accordance with a kind of pixel specified by the shape information, and the number in accordance with a kind of pixel specified by the shape information is smaller than a total number of pixels within the image area.

23 Claims, 17 Drawing Sheets

DOCUMENT DECORATION REPRESENTATION, THE TARGET OF THE PRESENT INVENTION

(51) Int. Cl.
*G06T 7/13* (2017.01)
*H04N 1/405* (2006.01)

(56) References Cited

U.S. PATENT DOCUMENTS

| | | | |
|---|---|---|---|
| 5,784,172 A * | 7/1998 | Coleman | G06K 15/02 |
| | | | 358/1.17 |
| 6,377,261 B1 * | 4/2002 | Fernandez | G06T 11/203 |
| | | | 345/467 |
| 6,639,593 B1 * | 10/2003 | Yhann | G06T 7/13 |
| | | | 345/419 |
| 6,707,939 B1 * | 3/2004 | Weinholz | G06T 9/005 |
| | | | 382/164 |
| 6,814,420 B2 | 11/2004 | Fujita et al. | 347/15 |
| 6,954,288 B2 | 10/2005 | Uekusa et al. | 358/1.9 |
| 6,980,326 B2 | 12/2005 | Tsuchiya et al. | 358/1.9 |
| 7,034,844 B2 | 4/2006 | Akiyama et al. | 345/590 |
| 7,075,679 B2 | 7/2006 | Goto et al. | 358/3.01 |
| 7,079,152 B2 | 7/2006 | Akiyama et al. | 345/589 |
| 7,158,671 B2 | 1/2007 | Yamazoe et al. | 382/167 |
| 7,266,239 B2 | 9/2007 | Akiyama et al. | 382/167 |
| 7,274,491 B2 | 9/2007 | Yamada et al. | 358/3.06 |
| 7,342,684 B2 | 3/2008 | Imafuku et al. | 358/1.9 |
| 7,599,552 B2 | 10/2009 | Yamazoe | 382/167 |
| 7,643,178 B2 | 1/2010 | Yamada et al. | 358/3.06 |
| 7,684,063 B2 | 3/2010 | Fujita et al. | 358/1.13 |
| 7,750,921 B2 | 7/2010 | Akiyama et al. | 345/590 |
| 7,912,280 B2 | 3/2011 | Miyagi et al. | 382/162 |
| 8,139,849 B2 | 3/2012 | Miyagi et al. | 382/162 |
| 8,184,349 B2 | 5/2012 | Yamazoe | 358/518 |
| 8,218,206 B2 | 7/2012 | Hori et al. | 358/518 |
| 8,290,259 B2 | 10/2012 | Umeda et al. | 382/167 |
| 8,390,889 B2 | 3/2013 | Iguchi | 358/3.01 |
| 8,482,804 B2 | 7/2013 | Hashii et al. | 358/3.27 |
| 8,498,016 B2 | 7/2013 | Goto et al. | 358/1.9 |
| 8,593,666 B2 * | 11/2013 | Xiao | G06F 3/1204 |
| | | | 358/1.15 |
| 8,616,668 B2 | 12/2013 | Saito et al. | 347/15 |
| 8,899,715 B2 | 12/2014 | Saito et al. | 347/15 |
| 8,934,140 B2 | 1/2015 | Hori et al. | 358/2.1 |
| 8,953,234 B2 | 2/2015 | Iguchi et al. | 358/518 |
| 9,055,252 B2 | 6/2015 | Miyake et al. | G06K 9/03 |
| 9,082,067 B2 | 7/2015 | Iguchi | H04N 1/00002 |
| 9,111,204 B2 | 8/2015 | Fujita et al. | G06K 15/188 |
| 9,162,477 B2 | 10/2015 | Ikeda et al. | H04N 1/6038 |
| 9,576,210 B1 * | 2/2017 | Liu | G06T 5/003 |
| 9,623,671 B2 | 4/2017 | Yamada et al. | B41J 2/2146 |
| 9,681,023 B1 * | 6/2017 | Subbaian | H04N 1/405 |
| 9,692,944 B2 | 6/2017 | Goto et al. | H04N 1/6041 |
| 9,694,598 B2 | 7/2017 | Ishikawa et al. | H04N 1/6033 |
| 9,785,819 B1 * | 10/2017 | Oreifej | G06K 9/00013 |
| 2002/0028027 A1 * | 3/2002 | Koyama | G06F 17/145 |
| | | | 382/289 |
| 2004/0183817 A1 * | 9/2004 | Kaasila | G06F 16/9577 |
| | | | 345/660 |
| 2006/0290950 A1 * | 12/2006 | Platt | G06T 5/20 |
| | | | 358/1.2 |
| 2007/0206877 A1 * | 9/2007 | Wu | G06K 9/3283 |
| | | | 382/275 |
| 2009/0046949 A1 * | 2/2009 | Ono | G06T 11/203 |
| | | | 382/284 |
| 2010/0157338 A1 | 6/2010 | Nakamura et al. | 358/1.9 |
| 2011/0206130 A1 * | 8/2011 | Koto | H04N 19/61 |
| | | | 375/240.21 |
| 2011/0316920 A1 | 12/2011 | Torigoe et al. | 347/14 |
| 2012/0081443 A1 | 4/2012 | Ono et al. | 347/15 |
| 2013/0044123 A1 * | 2/2013 | Shah | G06F 8/38 |
| | | | 345/594 |
| 2014/0299669 A1 * | 10/2014 | Tonnelier | G06K 19/06037 |
| | | | 235/494 |
| 2015/0269703 A1 * | 9/2015 | Chapman | G06T 1/0021 |
| | | | 358/3.28 |
| 2017/0173971 A1 | 6/2017 | Yamada et al. | H04N 1/00045 |

* cited by examiner

|  -1 | -1 | -1 |
| --- | --- | --- |
| -1 |  8 | -1 |
| -1 | -1 | -1 |
FIG.5A
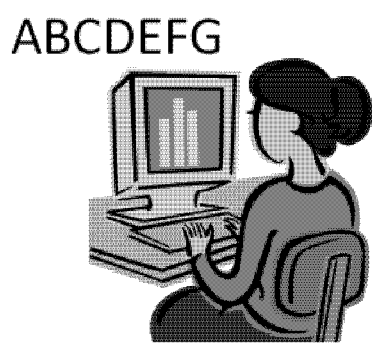
FIG.5B
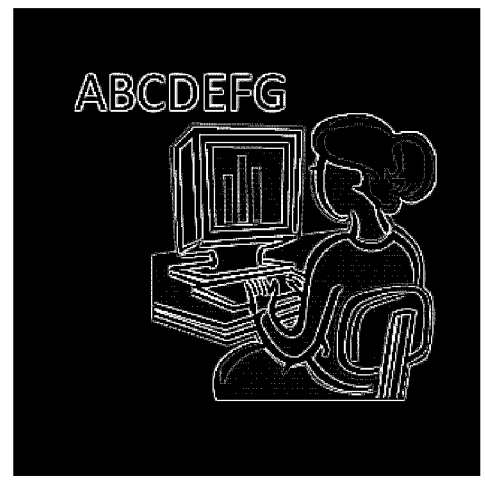
FIG.5C

IMAGE PROCESSING METHOD WITH PREDETERMINED BITMAP FORMATTING, AND IMAGE PROCESSING APPARATUS AND STORAGE MEDIUM THEREWITH

BACKGROUND OF THE INVENTION

Field of the Invention

The present invention relates to a technique of image processing in a printer and the like, and particularly, to a technique to store information on image data in the bitmap format, which is obtained by rendering processing for PDL data.

Description of the Related Art

In a common printer, a method is frequently used, in which an image in the PDL format is developed into an image in the bitmap format and the image in the bitmap format is stored on a memory and then image processing is performed. By this method, for example, as to a character, a high-quality output is implemented by producing a high-resolution plane, such as 1200 dpi×1200 dpi and 2400 dpi×2400 dpi, in order to obtain sharp output results.

Japanese Patent Laid-Open No. H10-240482(1998) discloses a technique to develop intermediate language data into bitmap data on a memory in the case where the intermediate language data is data in which importance is attached to the resolution.

SUMMARY OF THE INVENTION

However, Japanese Patent Laid-Open No. H10-240482 (1998) does not disclose a unit capable of specifying a plurality of colors while storing information on a shape. Specifically, for example, an appropriate format for image data including "a black character on an intermediate color background" is not disclosed. In Japanese Patent Laid-Open No. H10-240482(1998), for such data, it is necessary to perform processing by regarding the data as data in which importance is attached to the gradation properties in order to store information on an intermediate color, which is a background color, and therefore, the resolution is reduced. Further, in the case where processing is performed by regarding the data as data in which importance is attached to the resolution, the information on an intermediate color will be lost due to binarization.

For example, in a business document, as shown in FIG. 1, representation in which a character is emphasized by arranging a pale intermediate color rectangle on the background of the character is used generally. In the case where the method of Japanese Patent Laid-Open No. H10-240482(1998) is applied to the image such as this, in the area that is desired to be emphasized (area in which the character string "the target" exists in FIG. 1), a reduction in the resolution or loss of the rectangle of the background will result. In the case where the resolution is reduced, there is a possibility that the characters are no longer legible and in the case where the rectangle of the background is lost, the emphasized representation is lost and a document in which a user's intent is not reflected is printed.

Consequently, in view of the above-described problem, an object of the present invention is to implement a bit pattern capable of specifying a plurality of colors while storing information on a shape.

The present invention is an image processing apparatus that converts image data in a bitmap format into data including a bit pattern and includes: a creation unit configured to create, based on pixel values of pixels within an image area of a predetermined size within the image data, the bit pattern storing shape information on the image area, which specifies to which pixel of a plurality of kinds of pixel each pixel within the image area corresponds, and color information on the image area, which specifies a number of colors in accordance with a kind of pixel specified by the shape information, and the number in accordance with a kind of pixel specified by the shape information is smaller than a total number of pixels within the image area.

Further features of the present invention will become apparent from the following description of exemplary embodiments with reference to the attached drawings.

BRIEF DESCRIPTION OF THE DRAWINGS

FIG. 5A to FIG. 5C are diagrams explaining edge detection processing in the first embodiment;

DESCRIPTION OF THE EMBODIMENTS

In the following, with reference to the drawings, preferred embodiments of the invention are explained as examples. However, contents of components, relative arrangement, and so on, described below are not intended to limit the scope of the invention only to those unless described specifically.

First Embodiment

Figure 1:
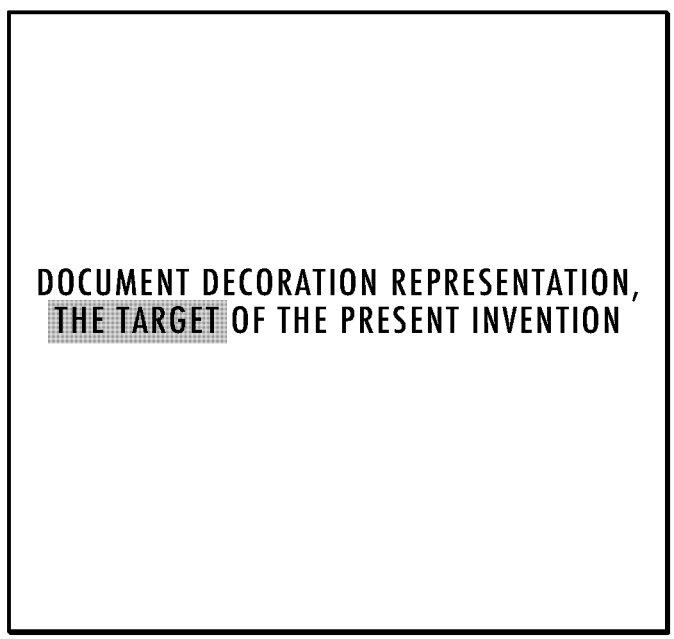
FIG. 1 is a diagram explaining a target of the present invention.
Figure 2:
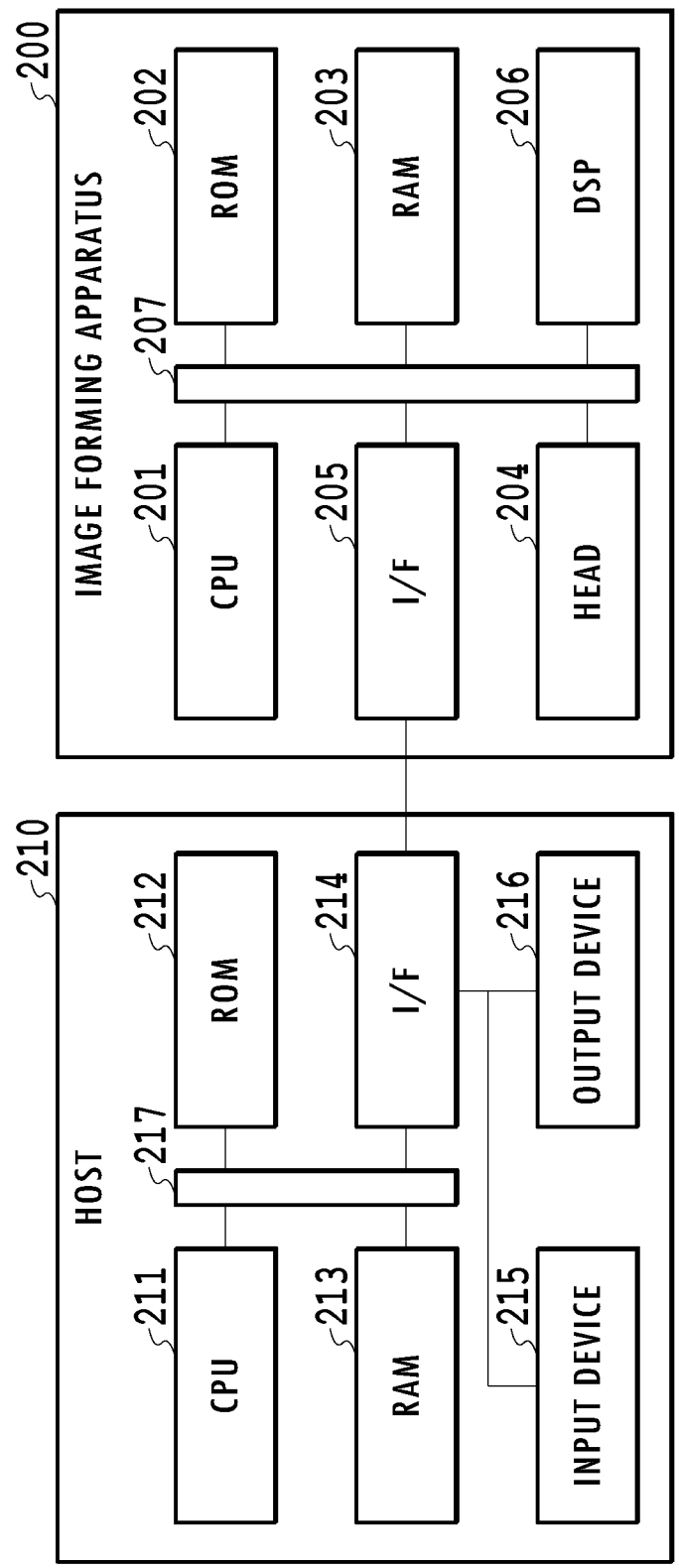
FIG. 2 is a block diagram of a system including an image forming apparatus in a first embodiment.

FIG. 2 is a block diagram of a system including an image forming apparatus 200 in the present embodiment. In this system, the image forming apparatus 200 and a host 210 are connected.

<About Image Forming Apparatus>

In the following, a configuration of the image forming apparatus 200 shown in FIG. 2 is explained. A CPU 201 executes programs stored in a ROM 202 by using a RAM 203 as a work memory and centralizedly controls each component of the image forming apparatus 200 via a bus 207. Due to this, various kinds of processing, to be described later, are performed. In the ROM 202, programs to perform printing processing, tables, an incorporated operating system (OS) program, and so on are stored. In the present embodiment, the programs stored in the ROM 202 perform scheduling and software control of a task switch and the like under the management of the incorporated OS stored in the ROM 202. Further, programs to perform flows in the present embodiment in FIG. 3 and the like are also stored in the ROM 202. The RAM 203 includes an SRAM (static RAM) and the like and in which a work area is provided at the time of executing a program.

A head 204 forms an image on a printing medium by ejecting a color material in synchronization with the conveyance of the printing medium (sheet and the like). An interface (hereinafter, IF) 205 connects the image forming apparatus 200 and an external device (in the present embodiment, the host 210) of the image forming apparatus 200 by wire or wirelessly. Although not shown schematically, the image forming apparatus 200 includes mechanisms, such as a motor that drives the head 204 and a motor that conveys a printing medium. Further, the image forming apparatus 200 may include a DSP (Digital Signal Processor) 206 as a hardware device to perform, in particular, processing with a heavy load, such as image processing.

These components are connected electrically to one another via the bus 207. Further, there is a case where all or part of these components are mounted as a single LSI and turned into a part as an ASIC.

In the following, the case is explained where the image forming apparatus 200 is an ink jet printer including one CPU, one ROM, and one RAM, respectively. However, the image forming apparatus 200 may include a plurality of CPUs, ROMs, and RAMS and the image forming apparatus 200 may be a printer employing any method, such as an electrophotographic method. Further, the image forming apparatus in the present embodiment is not limited to a dedicated apparatus specialized in the printing function and includes a multi function printer that combines the printing function with other functions, a production apparatus that forms an image or a pattern on a printing medium, and so on.

<About Host>

The image forming apparatus 200 is connected with the host 210 via the I/F 205. The host is a computer having the processing capability, and in addition to a common PC, a mobile telephone, a smartphone, a tablet, a digital camera, a mobile terminal, a stationary terminal, and so on are supposed. Depending on the main purpose of each apparatus, the details of the devices included in the host differ, but generally, the host includes a CPU, a ROM, a RAM, an IF, an input device, and an output device.

In the following, the configuration of the host 210 shown in FIG. 2 is explained. A CPU 211 executes programs stored in a ROM 212 by using a RAM 213 as a work memory and centralizedly controls each component of the host 210 via a bus 217. An IF 214 connects the host 210 and the image forming apparatus 200 by wire or wirelessly. These components are electrically connected to one another via the bus 217. Further, the host 210 includes an input device 215 by which a user inputs instructions to the host and an output device 216 that outputs (presents) information to a user, which are connected via the IF 214.

<About Data Transmission Processing from Host to Image Forming Apparatus>

In the following, data transmission processing from the host to the image forming apparatus is explained by taking the case as an example where a document is printed from a smartphone by using an ink jet printer.

In the case where a user who is browsing a document on a smartphone desires to print the document being browsed, the user inputs printing instructions by operating the smartphone. In the case where printing instructions are input, the OS on the smartphone creates a print job in accordance with a printing protocol after converting the document into image data in some format (for example, the printing-target document is converted into PDF data and a print job in the XML format including the PDF data is created). The smartphone transmits the created print job to an ink jet printer.

<About Processing Performed by Ink Jet Printer>

Figure 3:
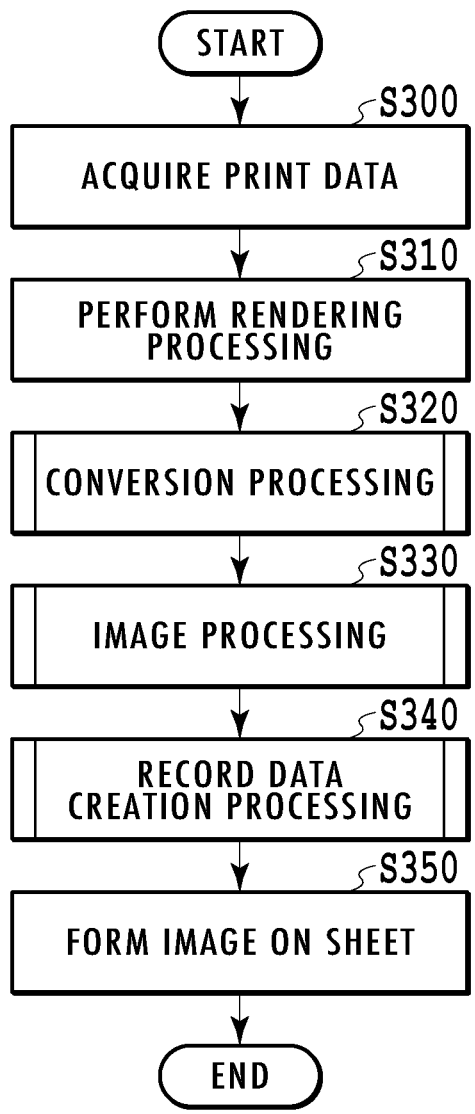
FIG. 3 is a flowchart of processing that is performed by a printer in the first embodiment.

In the following, processing that is performed by an ink jet printer is explained by using FIG. 3.

At step S300, the CPU 201 analyzes a print job transmitted from the host, such as the above-described smartphone, and acquires print data. Specifically, the CPU 201 analyzes the print job by using an XML parser, acquires setting information including information on a sheet to be used, printing grade, and so on, and data described in a PDL (PDL data), and stores the acquired setting information and PDL data in the RAM 203.

At step S310, the CPU 201 creates an intermediate file called a display list by interpreting the PDL data derived at step S300. Then, the CPU 201 performs rendering processing for the display list and creates a 2400 dpi×2400 dpi bitmap image in which each pixel has a 16-bit value for each channel of R (red), G (green), and B (blue). This bitmap image is abbreviated to a "2400 dpi×2400 dpi, 16-bit, 3-ch bitmap image" and other bitmap images are similarly abbreviated. The bitmap image that is created at this step is not limited to a 16-bit bitmap image and it may also be possible to create a bitmap image (for example, a bitmap image with a small number of bits, such as an 8-bit, 3-ch bitmap image) in accordance with the processing capability of a printer. Further, it may also be possible to create a display list or to create a bitmap image for the entire page at a time, or in units of bands in response to a request from subsequent step S330 in order to suppress the use of the RAM 203. Furthermore, it may also be possible for the DSP 206 to perform this step in place of the CPU 201.

Figure 6A:
FIG. 6A to FIG. 6C are diagrams explaining bit patterns of an edge area in the first embodiment.

At step S320, the CPU 201 performs conversion processing for the bitmap image derived at step S310. In the conversion processing, an area of 4×4 pixels in the 2400 dpi×2400 dpi image is handled as one tile and whether the tile is the edge area or the solid area is determined for each tile. Then, each tile is represented by a 32-bit bit pattern (FIG. 6A) in accordance with the determination results. Specifically, the tile determined to be the edge area is represented by a 32-bit bit pattern shown in FIG. 6B and on the other hand, the tile determined to be the solid area is represented by a 32-bit bit pattern shown in FIG. 7A. As above, in the present embodiment, for both the edge area and the solid area, the information on all the pixels within each image area is represented by a 32-bit bit pattern. The data amount (32 bits) of the bit pattern is smaller than the data amount (768 bits) of all the pixels making up the edge area or the solid area. Here in the highest-order bit b31 of the bit pattern, an identification flag indicating to which of the edge area and the solid area the tile corresponds is stored and 0 is stored in the case of the edge area and 1 is stored in the case of the solid area. On the other hand, in the lower-order bits except for the highest-order bit, data in accordance with the information on each tile is stored. The conversion processing at this step will be described later by using FIG. 4.

At step S330, the CPU 201 performs image processing based on the data derived by the conversion processing at step S320. By this step, image data in which each pixel has a value of an ink color is derived and loaded onto the RAM 203. This image data is, for example, 1-bit, 4-ch image data in which each pixel has a 1-bit value for each channel of C (cyan), M (magenta), Y (yellow), and K (black). The image processing at this step will be described later by using FIG. 9.

At step S340, the CPU 201 creates record data based on the image data derived at step S330. This record data is, for example, binary image data in which each pixel has a value of 0 or 1 for each channel of ink colors (CMYK and the like). The record data that is created at this step is loaded onto the RAM 203 so that an image is formed in the correct direction on a sheet in the case where the record data is transmitted to the head 204. The record data creation processing at this step will be described later by using FIG. 10.

At step S350, the CPU 201 transmits the record data derived at step S340 to the head 204 and performs image forming processing to actually form an image on a sheet by driving the head 204 and a feeder based on the transmitted record data. The image forming processing at this step will be described later by using FIG. 11.

<About Conversion Processing>

In the following, the conversion processing (step S320 in FIG. 3) in the present embodiment is explained by using FIG. 4.

At step S400, the CPU 201 performs edge detection processing to apply an edge filter to the bitmap image derived at step S310. In the present embodiment, the CPU 201 performs a convolution operation using a 3×3 filter shown in FIG. 5A. For example, in the case where the filter shown in FIG. 5A is convoluted in the image shown in FIG. 5B, an edge image shown in FIG. 5C is derived.

At step S410, the CPU 201 initializes n, that is, sets 1 to the value of n. Here, n is a parameter representing a processing-target area, that is, a tile of interest that is an area of a predetermined size within the image data (in the present embodiment, an area of 4×4 pixels in a 2400 dpi×2400 dpi image). Processing at subsequent step S420 to step S460 is performed sequentially for each tile, and therefore, initialization is performed at this step.

At step S420, the CPU 201 derives an amount of edge of the area (area of interest) corresponding to the tile of interest in the edge image derived at step S400. Here, the amount of edge is a parameter that is used as an index at the time of determining whether the tile of interest is the edge area (that is, whether the tile of interest is the area to be reproduced with a high resolution), and is the sum of the pixel value of each pixel within the area of interest. In the present embodiment, in the case where the amount of edge of an arbitrary area of interest is larger than a predetermined threshold value Th1, it is assumed that the tile of interest corresponding to the area of interest is determined to be the edge area.

At step S430, the CPU 201 determines whether the amount of edge of the area of interest is larger than the threshold value Th1. In the case where the results of the determination at step S430 are affirmative, the tile of interest is determined to be the edge area and the processing advances to step S431. On the other hand, in the case where the results of the determination at step S430 are negative, the tile of interest is determined to be the solid area and the processing advances to step S435. The algorithm from the edge detection to the edge area determination is not limited to the method described previously and another method may be used and a combination of publicly known techniques may be used. For example, it may also be possible to determine whether the object is text based on the display list derived at step S310 and to determine whether the tile of interest is the edge area or the solid area by using the results of the determination.

Figure 16:
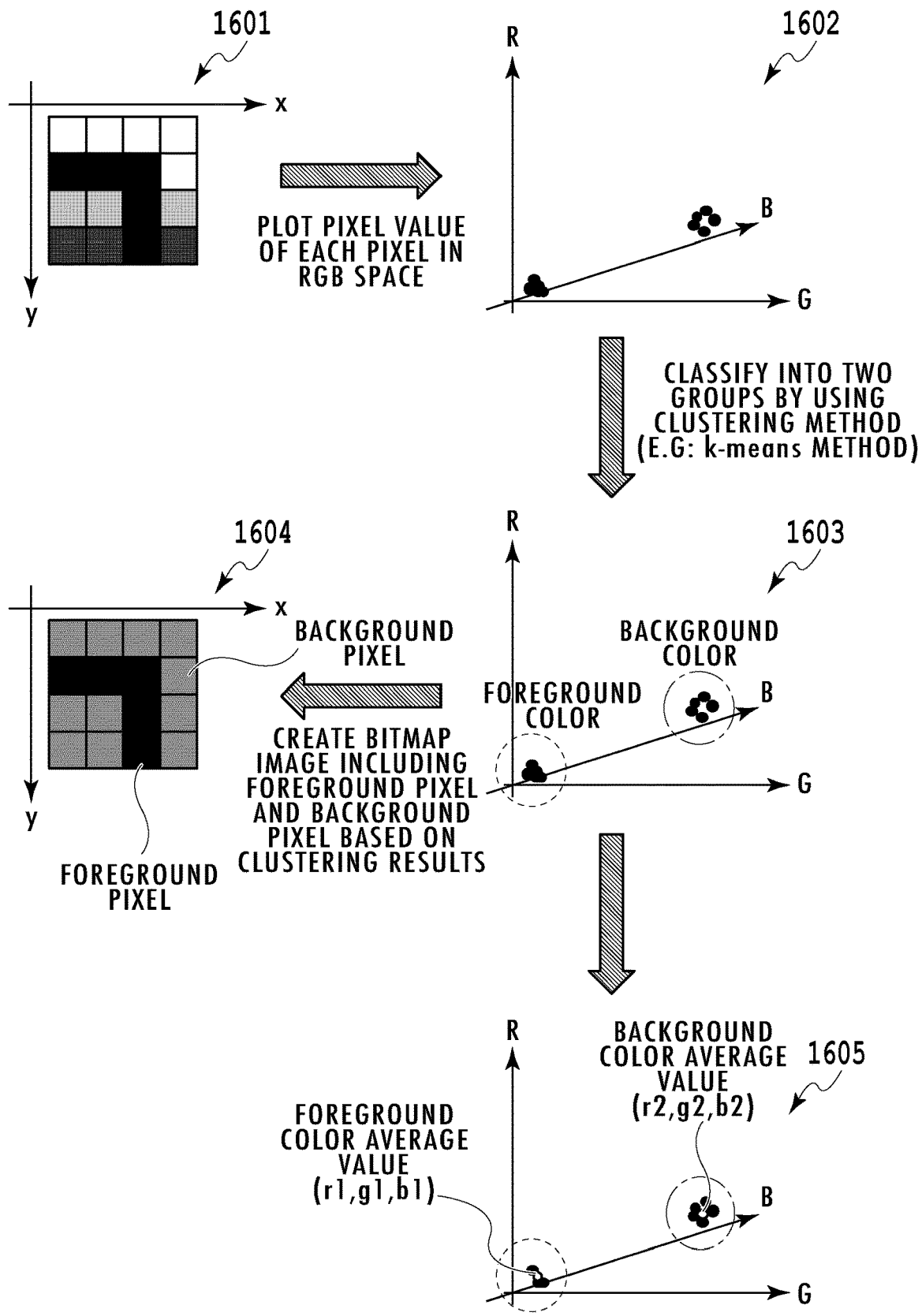
FIG. 16 is a diagram explaining binarization processing.

In the following, the case is explained where the tile of interest is determined to be the edge area (YES at step S430). In this case, at step S431, the CPU 201 performs quantization processing for the tile of interest in a full-color image derived at step S310 and derives a bitmap pattern represented by only the two colors of the foreground color and the background color. For derivation of the bitmap pattern at this step, it may also be possible to use an arbitrary method, such as adaptive binarization processing. Here, an example of the adaptive binarization processing is explained by using FIG. 16. First, the pixel value of each pixel making up a two-dimensional image on a two-dimensional XY-plane as indicated by symbol 1601 in FIG. 16 is plotted in an RGB space as indicated by symbol 1602. For this, by using a clustering method (for example, k-means method), the colors are divided into two groups as indicated by symbol 1603 and one of the two divided groups is determined to be the background color (light color) and the other is determined to be the foreground color (dark color). In the case where the results indicated by symbol 1603 are fed back to the two-dimensional XY-plane, a two-dimensional image consisting of two kinds of pixel, that is, the foreground pixel and the background pixel, is obtained as indicated by symbol 1604. The pixel value of the foreground pixel and that of the background pixel are taken to be the average value of the colors of each group, respectively, as indicated by symbol 1605. By this step, shape information (16-bit data) indicating which pixel corresponds to the foreground pixel and which pixel corresponds to the background pixel of the 4×4 pixels making up the tile of interest is acquired. Specifically, shape information that takes a value of 0 in the case where the pixel of interest corresponds to the background pixel while taking a value of 1 in the case where the pixel of interest corresponds to the foreground pixel is stored in a 16-bit area "map 4×4" at the end of the 32-bit bit pattern shown in FIG. 6B. As above, at this step, the CPU 201 functions as a shape information derivation unit.

Figure 17:
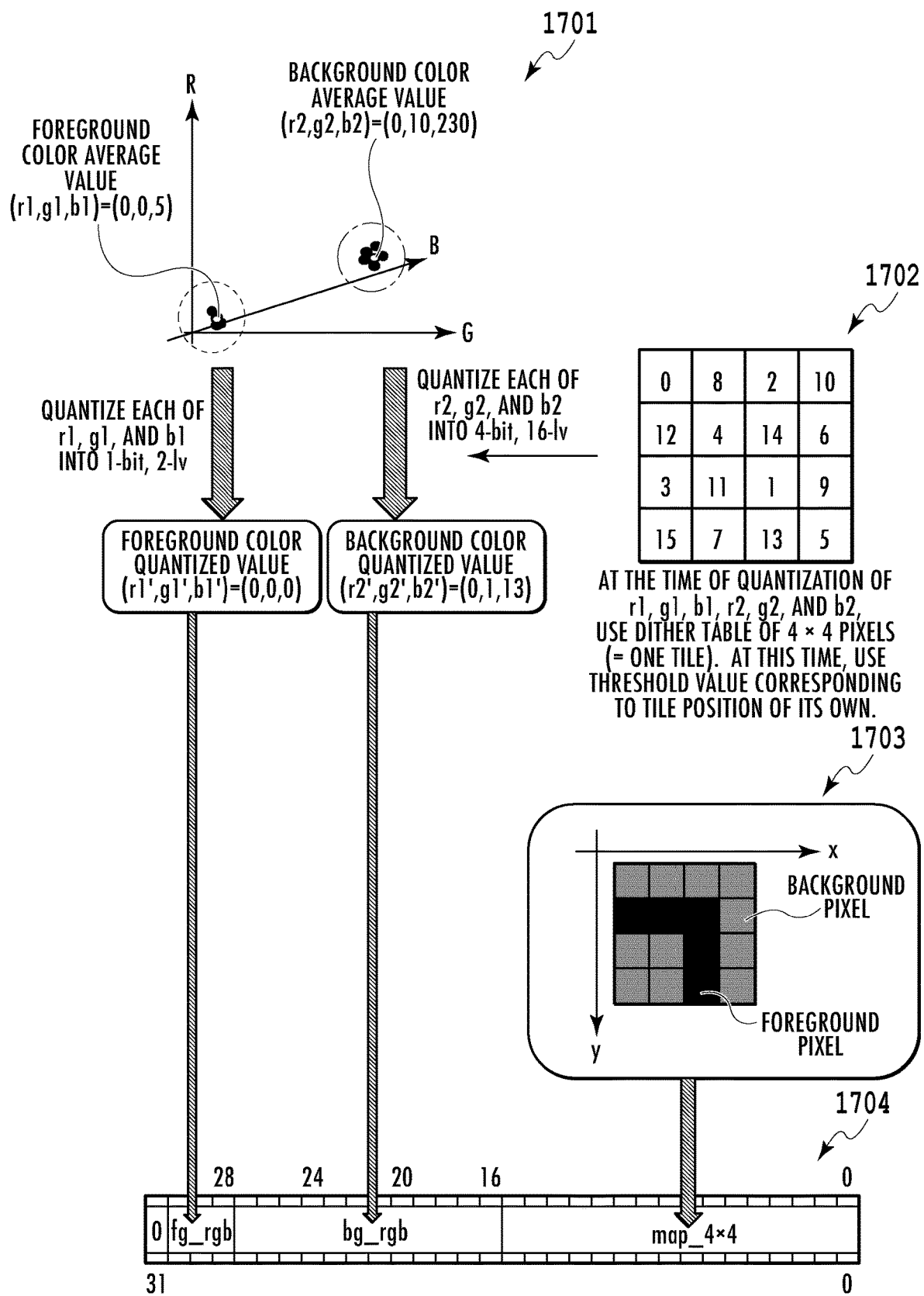
FIG. 17 is a diagram explaining a color information derivation method.

At step S432, the CPU 201 performs color reduction processing to reduce the number of tone levels for each of the two colors (16-bit, 3-ch each) used in the bitmap pattern derived at step S431. Specifically, the foreground color is represented by 1-bit, 3-ch data, that is, 3-bit data in which each channel of RGB has a 1-bit value and on the other hand, the background color is represented by 4-bit, 3-ch data, that is, 12-bit data in which each channel of RGB has a 4-bit value. That is, it is possible to specify one of eight kinds of pure color of white, black, red, blue, green, cyan, magenta, and yellow as the foreground color. The RGB values of the foreground color after the color reduction processing are stored in a 3-bit area "fg_rgb" of the bit pattern shown in FIG. 6B and the RGB values of the background color after the color reduction processing are stored in a 12-bit area "bg_rgb". As above, at this step, the CPU 201 functions as a color information derivation unit. Here, the derivation method of color information is explained specifically by using FIG. 17. In the present embodiment, for each of the background color average value and the foreground color average value as indicated by symbol 1701, which are explained by using FIG. 16, quantization processing using a dither table as indicated by symbol 1702 is performed. The dither table has threshold values for each tile in units of 4×4 pixels (=one tile). This quantization processing may be performed by using an already-known algorithm. For example, in the case where the quantization processing is performed by using the dither table indicated by symbol 1702 for a background color average value of (0, 10, 230) and a foreground color average value of (0, 0, 5), as the background color quantized value, (0, 1, 13) is obtained and as the foreground color quantized value, (0, 0, 0) is obtained. After the quantization processing, the quantized values obtained for the background color and the foreground color, respectively, are stored in the corresponding portions of the bit pattern. It may also be possible to use each bit pattern as a palette color having a dictionary for each page. In the case where the bit pattern described previously is used as a palette color, it is made possible to specify any one of eight colors as the foreground color and any one of 2^12=4096 colors as the background color. By switching the palette to be used to another in accordance with the contents of each page, color representation in accordance with the contents of each page is enabled.

Next, the case is explained where the tile of interest is determined to be the solid area (NO at step S430). In this case, at step S435, the CPU 201 calculates the sum value by adding the pixel value of each pixel within the tile of interest in the full-color image derived at step S310. As described above, in the present embodiment, the tile of interest refers to the area of 4×4 pixels of the 2400 dpi×2400 dpi image and each pixel making up the tile of interest has 16-bit, 3-ch information. Consequently, in this step, as a result of totalizing the pixel values of the 16 pixels having a value within the value range between 0 and 65535 per channel in the original image, the tile of interest has a value within the value range between 0 and 1048560 per channel and the value such as this can be represented by 20 bits.

At step S436, the CPU 201 performs the color reduction processing to reduce the number tone levels for each of the RGB values (20-bit each) derived at step S435 and derives each of 10-bit RGB values. The R value derived at this step is stored in a 10-bit area "r10" of the bit pattern shown in FIG. 7A and similarly, the G value is stored in a 10-bit area "g10" and the B value is stored in a 10-bit area "b10". The 10-bit, 3-ch information derived at steps S435 and S436 is handled as information on one pixel in a 600 dpi×600 dpi image at subsequent steps.

As explained already, the data size (bit length) of both the bit pattern (FIG. 6B) representing the edge area and the bit pattern (FIG. 7A) representing the solid area is 32 bits. By making the same the data size of the data format in different image areas as described above, easy random access is enabled in units of assigned formats and it is possible to improve efficiency of data processing.

Figure 4:
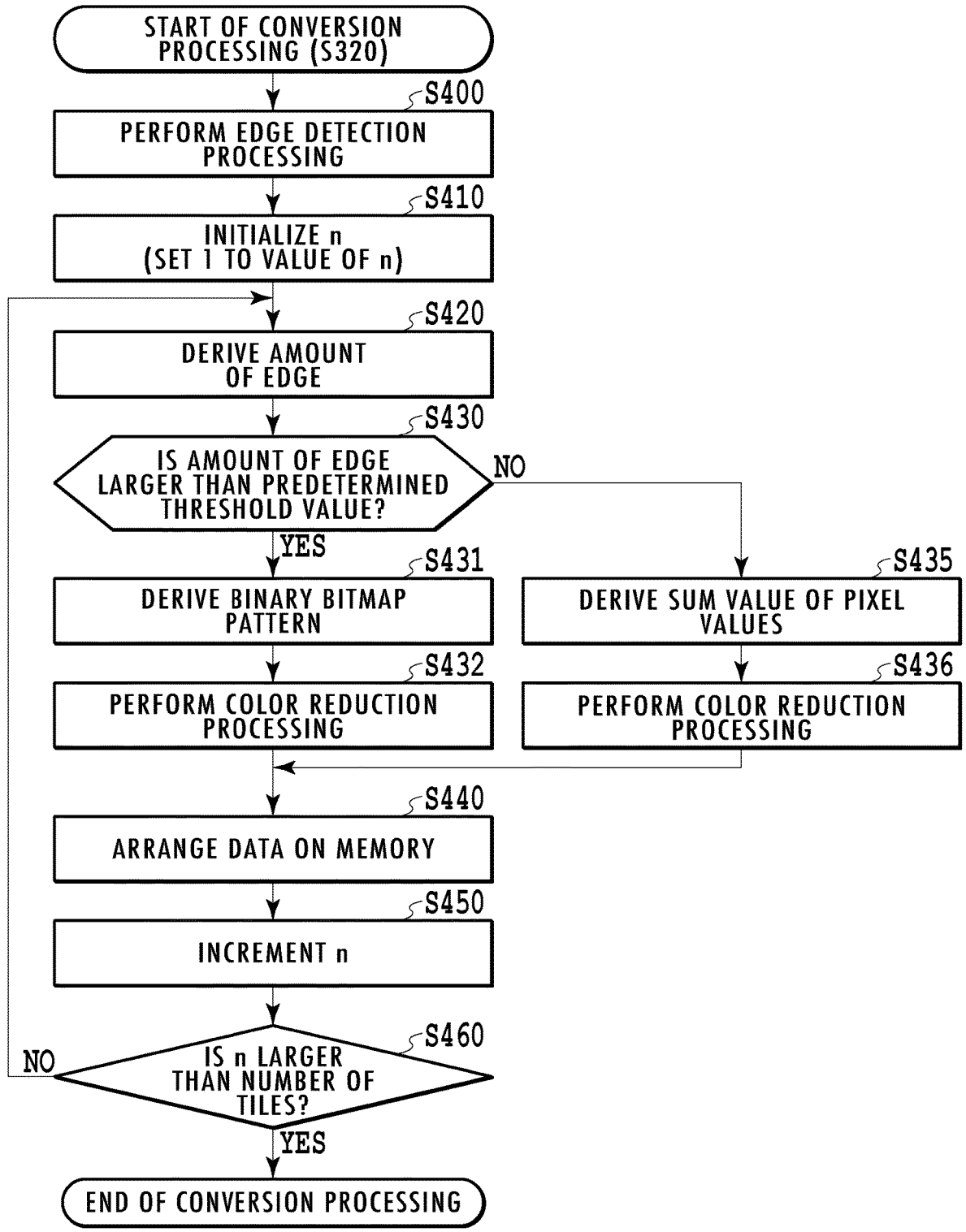
FIG. 4 is a flowchart of conversion processing in the first embodiment and in a second embodiment.
Figure 6B:
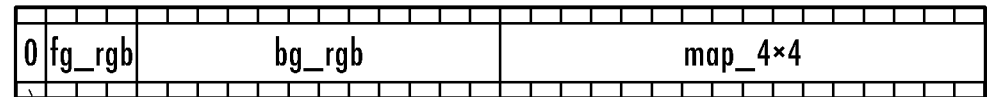
Figure 6C:
Figure 7A:
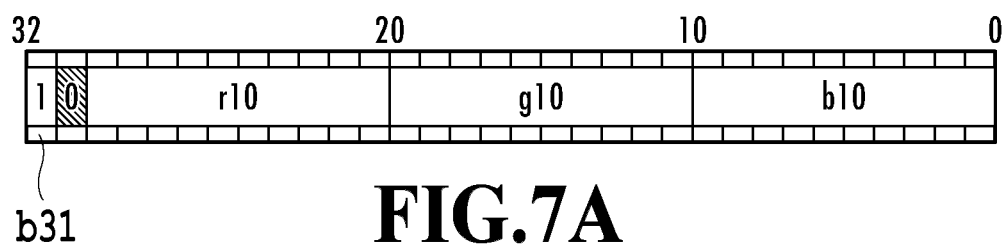
FIG. 7A and FIG. 7B are diagrams explaining bit patterns of a solid area in the first embodiment.
Figure 7B:
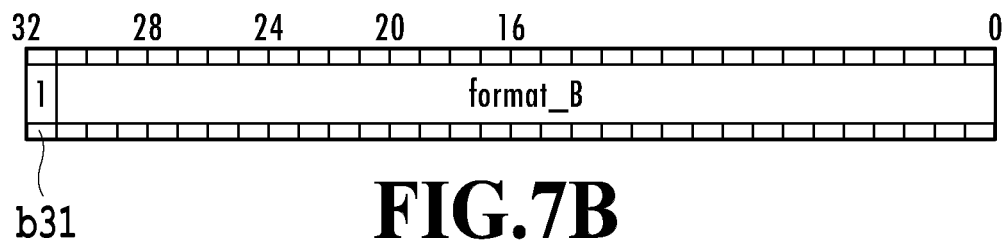
Figure 8:
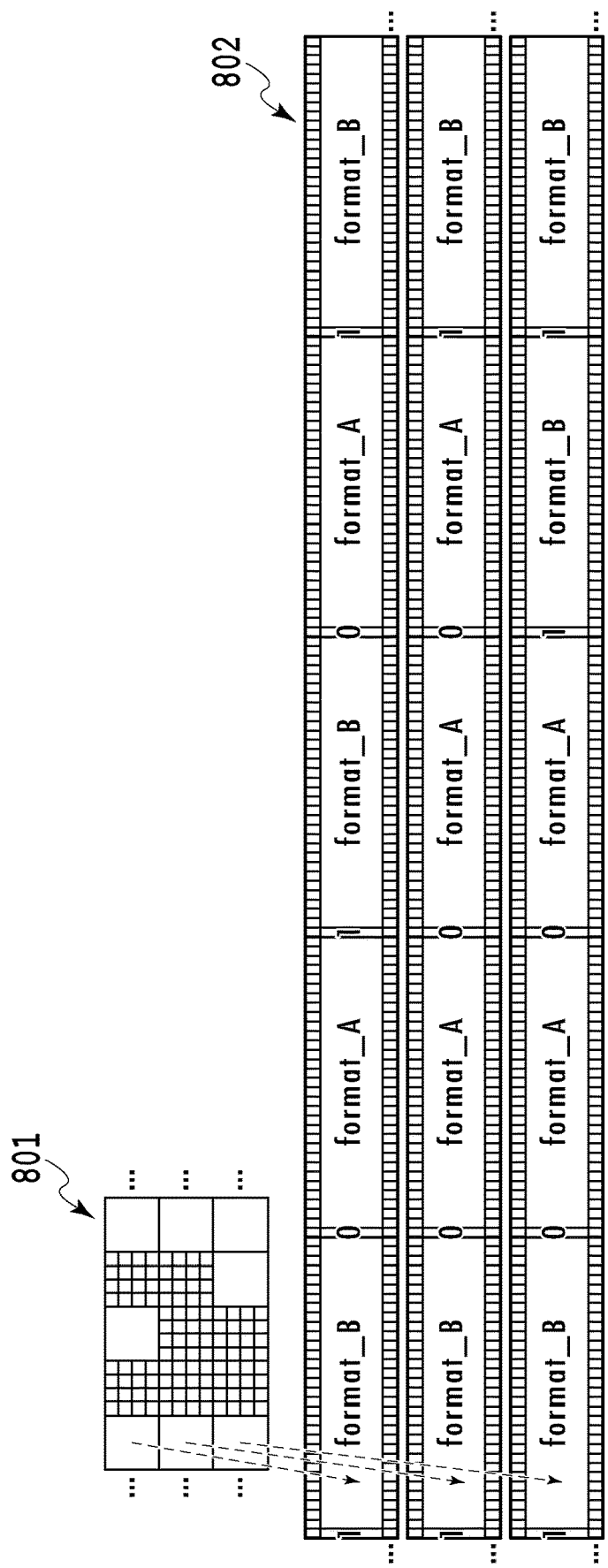
FIG. 8 is a diagram explaining how image information is arranged on a memory after conversion processing has been completed for image data.

Explanation is returned to the flow in FIG. 4. At step S440, the CPU 201 arranges the bit pattern on a memory. FIG. 8 is a diagram explaining how the information on an image is arranged on a memory after the conversion processing for the image data is completed. Symbol 801 in FIG. 8 indicates image data made up of two kinds of image area, that is, an edge area and a solid area and symbol 802 indicates how information on an image is arranged on a memory after the conversion processing is completed. In FIG. 8, the bit pattern of the edge area shown in FIG. 6B is represented in the abbreviated format shown in FIG. 6C and the bit pattern of the solid area shown in FIG. 7A is represented in the abbreviated format shown in FIG. 7B.

At step S450, the CPU 201 increments n.

At step S460, the CPU 201 determines whether n is larger than the total number of tiles. In the case where the results of the determination at step S460 are affirmative, the series of processing ends. On the other hand, in the case where the results of the determination are negative, the processing returns to step S420. The above is the contents of the conversion processing in the present embodiment.

In the conversion processing of the present embodiment, for the edge area, the shape is represented with a high resolution (for each pixel in the 2400 dpi×2400 dpi image) at the sacrifice of representing the background color and the foreground color by a small number of bits (small number of tone levels). On the other hand, for the solid area, the color is represented by a large number of bits (large number of tone levels) at the sacrifice of representing the shape with a low resolution (for each pixel in the 600 dpi×600 dpi image).

Here, the color reproduction capability in an image is determined based on the number of colors (in the present embodiment, three colors of R, G, and B) that can be made use of at the same time in an image and the number of tone levels that can be represented in each color. On the other hand, the shape reproduction capability in an image depends on a degree of fineness of units in which the signal value of each pixel can be represented (that is, depends on a degree of highness of a resolution with which the signal value of each pixel can be represented). That is, in the present embodiment, in the edge area, priority is given to the shape reproduction capability over the color reproduction capability and in the solid area, priority is given to the color reproduction capability over the shape reproduction capability and at the same time, the edge area and the solid area are represented by the bit pattern of the same data size.

<About Image Processing>

In the following, the image processing (step S330 in FIG. 3) in the present embodiment is explained by using FIG. 9. This image processing is performed for all the bit patterns on the memory arranged as in FIG. 8.

At step S900, the CPU 201 initializes the value of m, that is, sets 1 to the value of m. Here, m is a parameter representing a processing-target bit pattern (hereinafter, bit pattern of interest). The processing at subsequent step S910 to step S960 is performed sequentially for each 32-bit pattern corresponding to one tile on the memory arranged as shown in FIG. 8, and therefore, initialization is performed at this step. As described previously, both the edge area of one tile and the solid area of one tile are represented by the 32-bit bit pattern, and therefore, for example, it is possible to sequentially perform processing for each bit pattern at a high speed by burst transfer and the like using a DMA controller.

At step S910, the CPU 201 determines which of the edge area and the solid area is represented by the bit pattern of interest. Specifically, the CPU 201 determines whether the highest-order bit (b31) of the bit pattern of interest is 0 and in the case where the results of the determination are affirmative, the CPU 201 determines that the bit pattern of interest represents the edge area and the processing advances to step S921. On the other hand, in the case of determining that b31 is not 0, the CPU 201 determines that the bit pattern of interest represents the solid area and the processing advances to step S931.

In the following, the case is explained where it is determined that the bit pattern of interest represents the solid area (YES at step S910). In this case, at step S921, the CPU 201 performs color conversion processing to convert each of the foreground color and the background color represented by the bit pattern of interest into a color within a record color space of the image processing apparatus within the printer. As the record color space, a color space that represents the gamut that can be printed and represented by the printer is used. By the color conversion processing at this step, an input color outside the gamut of the printer is converted into a color within the gamut of the printer (gamut compression). At step S432, the foreground color in the edge area is reduced to three bits (eight colors) and the background color is reduced to 12 bits (4096 colors), and therefore, by preparing in advance a color conversion LUT directly corresponding to these colors, it is possible to easily perform the color conversion processing at this step. That is, it is possible to omit linear interpolation operation processing after the LUT is referred to, which occurs at the time of the normal color conversion processing.

At step S922, the CPU 201 performs color separation processing to convert multivalued information on the colors derived at step S921 into multivalued information on color materials used in the printer for each of the foreground color and the background color. For example, in the case of an ink jet printer (hereinafter, CMYK ink jet printer) in which inks of four colors of C, M, Y, and K are used, values of RGB are converted into values of CMYK. For example, RGB (0, 0, 0) representing black is converted into CMYK (0, 0, 0, 255) and RGB (255, 0, 0) representing red is converted into CMYK (0, 255, 255, 0).

At step S923, the CPU 201 performs tone level correction processing to correct the tone level of the signal value of each ink color after the color separation processing, which is derived at step S922, for each of the foreground color and the background color. The purpose of performing the tone level correction processing at this step is as follows. Normally, in the case of an ink jet printer, the larger the amount of ink to be ejected per unit area, the more strongly the color of the ink appears on the surface of paper. However, there is a nonlinear relationship between the amount of ink to be ejected and the coloring properties (spectral reflectance, Lab value, and so on) on the surface of paper, and therefore, in order to correct the coloring properties, the tone level correction processing is performed at this step. There is a possibility that the amount of ink to be ejected changes depending on the manufacturing tolerance of the head 204, and therefore, it may also be possible to absorb the error by the tone level correction processing at this step. In that case, as a method of estimating the amount of ejection of the head, it is possible to use any publicly known technique, such as a method in which a user is caused to print a test pattern.

At step S924, the CPU 201 performs quantization processing to binarize the signal value of each ink color, which is derived at step S923. Here, while the processing at step S921 to step S923 in the previous stages is performed for each bit pattern of interest, it is necessary to perform the quantization processing at this step in units of pixels within the tile corresponding to the bit pattern of interest, that is, with a resolution of 2400 dpi×2400 dpi. Specifically, based on the shape information stored in "map_4×4" of the bit pattern shown in FIGS. 6A to 6C, to which of the foreground pixel and the background pixel each pixel corresponds is determined. Then, in accordance with the results of the determination, a value obtained by binarizing the signal value of each ink color (foreground color or background color) derived at step S923 is allocated to each pixel. For example, in the case of a CMYK ink jet printer, by this step, total of 64-bit output results corresponding to 16 pixels (that is, corresponding to one tile) having 1-bit, 4-ch value are obtained.

Next, the case is explained where it is determined that the bit pattern of interest represents the solid area (NO at step S910). In this case, at step S931, the CPU 201 performs color conversion processing to convert the color represented by the values of r10, g10, and b10 (FIG. 7A) in the bit pattern of interest into a color within the record color space of the image processing apparatus within the printer.

At step S932, the CPU 201 performs color separation processing to convert the multivalued information on the colors derived at step S931 into multivalued information on color materials of the printer.

At step S933, the CPU 201 performs tone level correction processing to correct the tone level of the signal value of each ink color after the color separation processing, which is derived at step S932.

At step S934, the CPU 201 performs quantization processing to convert the signal value of each ink color, which is derived at step S933, into the ejection level that specifies the amount of ink to be ejected per unit area. Here, the ejection level takes values in 16 steps (0 to 15). At this step, only the ejection level is derived and by index development processing that follows (step S935), whether or not ejection is performed and the number of droplets to be ejected for each nozzle are found. By the quantization processing at this step, the value (one of 0 to 15) for each pixel in the 600 dpi×600 dpi image is obtained.

At step S935, the CPU 201 performs the index development processing based on the ejection level derived at step S934. The index development processing is processing to develop one pixel in a 600 dpi×600 dpi image into a bitmap pattern of 4×4 pixels in a 2400 dpi×2400 dpi image. Specifically, a bitmap pattern is created by determining the pixel values of 4×4 pixels in the 2400 dpi×2400 dpi image based on the value of the ejection level of each ink color, which is possessed by one pixel in the 600 dpi×600 dpi image. It may also be possible to perform the index development processing by using a well-known technique. For example, it may also be possible to store in advance dot arrangement in accordance with the ejection level as a table and to determine the dot arrangement by using a table in accordance with the ejection level derived at step S934. By the index development processing at this step, the final dot arrangement destination onto the surface of paper is determined. For example, in the case where it is possible for the head 204 to arrange dots with a resolution of 2400 dpi×2400 dpi onto the surface of paper, whether or not a dot is arranged to each of the coordinates obtained by partitioning the surface of paper into 2400 dpi×2400 dpi grids is determined. By this step, total of 64-bit output results corresponding to 16 pixels (that is, corresponding to one tile) having a 1-bit, 4-ch value are obtained.

At step S940, the CPU 201 stores the 64-bit output results obtained at step S924 or step S935 in a buffer on the RAM 203. At the point in time of being stored in the buffer at this step, both the data of the edge area and the data of the solid area begin to have the same meaning as information to control whether or not to eject ink (On/Off) for each nozzle of the 2400 dpi head 204. Consequently, for the processing after the record data creation processing at subsequent step S340, it is sufficient to perform the same processing as that in the conventional printer.

At step S950, the CPU 201 increments m.

At step S960, the CPU 201 determines whether m is larger than the total number of bit patterns. In the case where the results of the determination at step S960 are affirmative, the series of processing ends. On the other hand, in the case where the results of the determination are negative, the processing returns to step S910. The above is the contents of the image processing in the present embodiment.

It may also be possible to implement the same tone level correction in all the model types of the printers by performing the tone level correction processing by using the amount of correction in accordance with the model type of the printer at step S923 or step S933.

In the above-described example, to which of the edge area and the solid area the tile corresponds is determined for each tile of interest (bit pattern of interest), and different processing is performed in accordance with the results of the determination. However, it may also be possible to separately perform the processing that is performed for the edge area and the processing that is performed for the solid area for all the tiles (all the bit patterns) and to use different results of the processing depending on the results of the image area determination of an image (determination of which of the edge area and the solid area). In this case, it is no longer necessary to selectively perform the image processing, and therefore, it is possible to prevent the printer circuit from becoming complicated and it is possible to reduce the processing time because the image processing is performed without the need to wait for the results of the image area determination.

<About Record Data Creation Processing>

Figure 10:
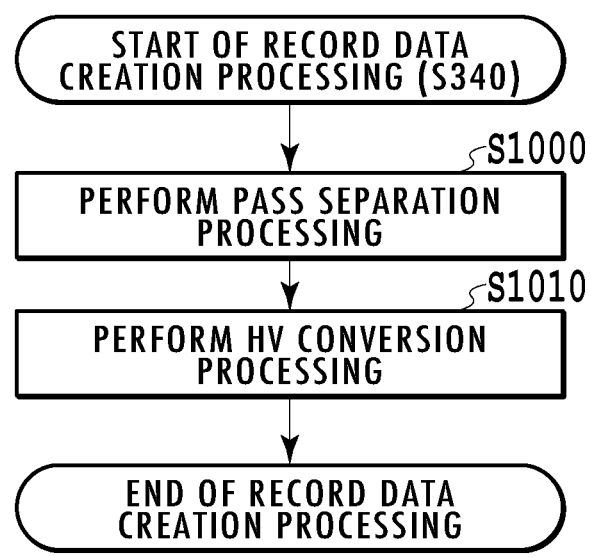
FIG. 10 is a flowchart of record data creation processing in the first embodiment.

In the following, the record data creation processing (step S340 in FIG. 3) in the present embodiment is explained by using FIG. 10.

At step 1000, the CPU 201 performs pass separation processing. With a serial head ink jet printer, in the case where the landing accuracy of a dot at the time of image formation is low, unevenness in color and streaks resulting from a deviation in the dot landing position cause a reduction in image quality. In order to avoid this, it is effective to form an image by performing a head scan a plurality of times (multi-pass method) rather than forming an image by a one-time head scan (single-pass method). Consequently, at this step, record data to perform printing by the multi-pass method is created. As a pass separation method, it may also be possible to use any publicly known technique.

The image processing hitherto described is performed by scanning an image in the raster direction and arranging processing results in the same direction on a RAM. However, at the time of transmitting the record data to the head 204, it is necessary to rearrange the image in the reception direction (for example, column direction) of the head 204. Consequently, at step 1010, the CPU 201 performs HV conversion processing to convert the image arranged in the raster direction into an image arranged in the column direction. It may also be possible to perform the HV conversion processing by memory access to the RAM 203. Alternatively, in order to increase the processing speed, it may also be possible to input directly the image arranged in the raster direction by burst transfer via dedicated hardware, to rearrange the image in the SRAM on the hardware, and to directly transfer the rearrangement results to the head 204 without performing any processing. The above is the contents of the record data creation processing in the present embodiment.

<About Processing to Form Image>

Figure 11:
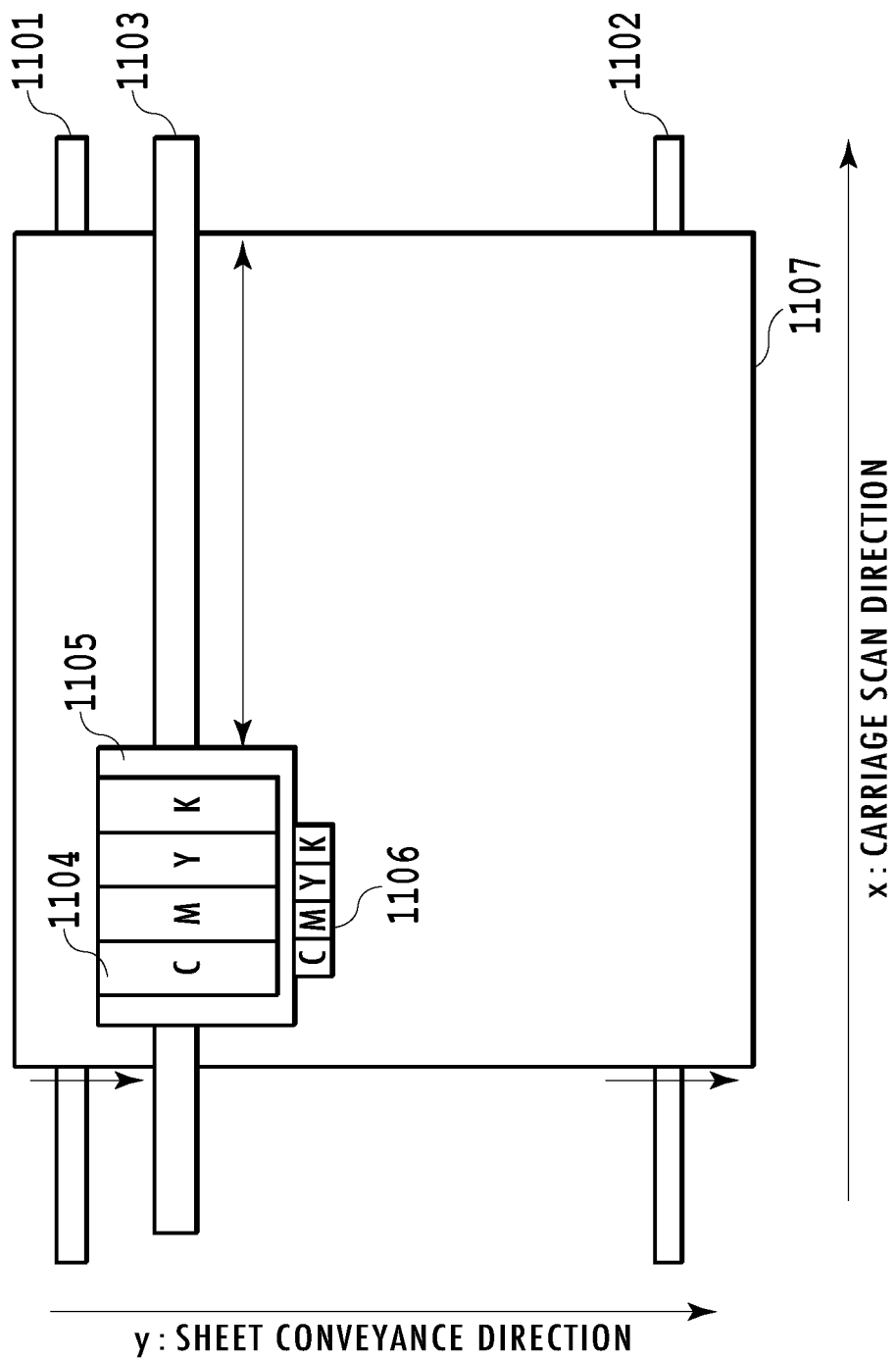
FIG. 11 is a diagram explaining a mechanism relating to image formation of a printer in the first embodiment.

In the following, the processing to form an image (step S350 in FIG. 3) in the present embodiment is explained by using FIG. 11. FIG. 11 is an outline diagram of a mechanism to form an image by ejecting ink droplets onto a sheet in a common serial head ink jet printer. In FIG. 11, an x-direction indicates the scan direction of a carriage 1105 and a y-direction indicates the conveyance direction of a sheet 1107.

As shown in FIG. 11, the ink jet printer includes a sheet feed shaft 1101 to feed a sheet and a sheet discharge shaft 1102 to discharge a sheet as sheet feed mechanisms and by rotating these shafts, the sheet 1107 is conveyed at a constant speed.

An ink tank 1104 storing each color ink of CMYK is installed on the carriage 1105 and the ink is supplied to an ejection head 1106 through a flow path within the carriage 1105. The carriage 1105 is attached to a conveyance rail 1103 and can move along the conveyance rail 1103. The ejection head 1106 is connected to the bus 207 of the printer via a communication cable (not shown schematically) and receives record data derived by the above-described HV conversion and head ejection control information to control timing of ink ejection. By the ink being ejected based on the record data and the head ejection control information, an image is formed on a sheet. As a method in which the ejection head ejects ink droplets onto a sheet, it may also be possible to employ one of the thermal method and the piezo method.

On the head, for example, 512 nozzles are arranged side by side in one row at 600 dpi intervals, which correspond to each ink color, and it is possible for the ink jet printer to independently control ON/OFF of ejection for each nozzle.

In the serial head ink jet printer, by controlling both the movement of the carriage and the conveyance of a sheet, the head is moved to an arbitrary position on the sheet and ink is ejected. For example, in the case where printing is performed for an A4-size (8.5 inches wide×11 inches long) sheet by the single-pass method, by ejecting ink while moving the carriage in the x-direction, image formation is performed for an area 8.5 inches wide×0.85 inches long by a one-time head scan. Next, by performing a head scan again after conveying the sheet 0.85 inches in the y-direction, image formation is performed for the next area 8.5 inches wide×0.85 inches long. By repeating the head scan and the sheet conveyance as described above, by the single-pass method, the image formation processing for the A4-size sheet is completed by performing the head scan 13 times. In the case where printing is performed by the multi-pass method, the conveyance distance of a sheet for each head scan is reduced than that at the time of image formation by the single-pass method and image formation in which the number of head scans is increased is performed. For example, in the case where printing is performed for an A4-size sheet by four passes, the conveyance distance of the sheet for each head scan is set to 0.21 inches and the image formation processing is completed by performing the had scan 52 times. The above is the contents of the processing to form an image in the present embodiment.

About Effects and the Like of the Present Embodiment

In the present embodiment, for both the edge area and the solid area in an image, the multivalued color information is represented by the bit pattern in the predetermined format (FIG. 6B, FIG. 7A). This bit pattern does not depend on the characteristics of the printer (the configuration of the inks used in the printer, the output characteristics of the head, and so on), and therefore, the bit pattern has an advantage in that it is not necessary to take into consideration the output destination printer at the time of creating the bit pattern. In particular, in the commercial printing, it is necessary to keep a high operating rate of the apparatus at all times by connecting a plurality of printer engines in parallel via a network and by equally allocating print jobs. In order to implement this, it becomes important whether the rendering processing (step S310) and the conversion processing (step S320) can be performed irrespective of the printer.

Further, it is common to perform RIP processing to create a raster image by rendering processing based on PDL data by using a dedicated RIP server. By using the RIP server as a common resource for all the printers without associating the RIP server with a specific printer, it is made possible to perform processing with maximum performance at all times irrespective of the operating situation of the individual printer.

Furthermore, in the case where the printer specified as the output destination cannot be used any more due to a failure and the like, in order to suppress the downtime to a minimum, it is required to immediately transmit the data after the RIP processing to another printer that can be used. In such a system also, by employing the format of the present embodiment as the data format after the RIP processing, it is made possible to make use of the data after the RIP processing in common by each printer, and therefore, the productivity can be increased.

In the present embodiment, the case is explained where the image area in which priority is given to the shape reproduction capability over the color reproduction capability is the edge area in which the foreground color and the background color are specified, but the number of colors specified by a bit pattern corresponding to the image area such as this is not limited to two. In the case where to which of three or more kinds of pixel each pixel corresponds is specified by the shape information on a bit pattern, the number of colors to be specified by the color information on the bit pattern is three or more. That is, in the bit pattern, colors in the number in accordance with the kind of pixel to be specified by the shape information are specified and this number only needs to be smaller than the total number of pixels within the image area, which is the unit of the shape information, and to be larger than one.

Further, in the present embodiment, the case is explained where the number of tone levels of both the foreground color and the background color specified by the bit pattern of the edge area is smaller than the number of tone levels of the color specified by the bit pattern of the solid area. However, it is only required for the number of tone levels of at least one of the foreground color and the background color specified by the bit pattern of the edge area to be smaller than the number of tone levels of the color specified by the bit pattern of the solid area.

Furthermore, in the present embodiment, the case is explained where the image area in which priority is given to the resolution over the gradation properties is the edge area and the image area in which priority is given to the gradation properties over the resolution is the solid area. However, the combination of the image area in which priority is given to the resolution over the gradation properties and the image area in which priority is given to the gradation properties over the resolution is not limited to the combination of the edge area and the solid area.

Second Embodiment

In the conversion processing in the first embodiment, by the color reduction processing (step S432) for the edge area, the foreground color is represented by 1-bit, 3-ch data, that is, 3-bit data, and the background color is represented by 4-bit, 3-ch data, that is, 12-bit data (FIG. 6B).

On the other hand, in the present embodiment, conversion processing to increase the size of a processing-target tile and to handle an area of 8×8 pixels in an image with a resolution of 2400 dpi×2400 dpi as one tile is performed. By the conversion processing of the present embodiment, both the edge area of one tile and the solid area of one tile are represented by a 128-bit bit pattern. Due to this, it is made possible to represent the foreground color and the background color of the edge area in full color (30-bit). In the following, differences from the first embodiment are explained mainly and explanation of the same configuration and the same processing as those of the first embodiment is omitted appropriately.

<About Conversion Processing>

In the following, the conversion processing in the present embodiment is explained by using FIG. 4.

At step S400, the CPU 201 performs edge detection processing to apply an edge filter to the bitmap image derived at step S310. In the present embodiment also, the 3×3 filer shown in FIG. 5A is used as in the first embodiment.

At step S410, the CPU 201 initializes n, that is, sets 1 to the value of n. Here, n is a parameter indicating a tile of interest that is a processing-target area (in the present embodiment, an area of 8×8 pixels in a 2400 dpi×2400 dip image).

At step S420, the CPU 201 derives the amount of edge of the area of interest in the edge image derived at step S400. In the present embodiment, in the case where the amount of edge of an arbitrary area of interest is larger than a predetermined threshold value Th2, the tile of interest is determined to be the edge area.

At step S430, the CPU 201 determines whether the amount of edge of the area of interest is larger than the threshold value Th2. In the case where the results of the determination at step S430 are affirmative, the tile of interest is determined to be the edge area and the processing advances to step S431. On the other hand, in the case where the results of the determination at step S430 are negative, the tile of interest is determined to be the solid area and the processing advances to step S435.

Figure 12:
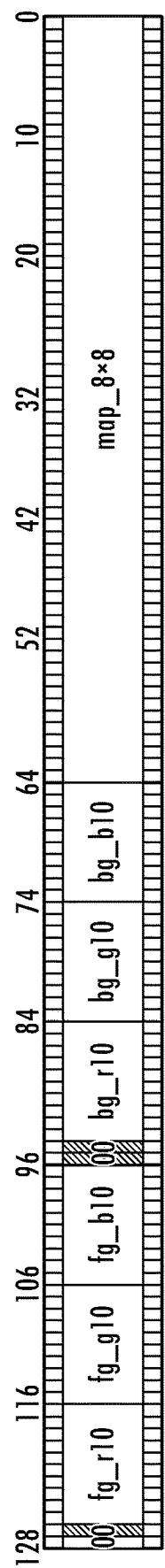
FIG. 12 is a bit pattern of an edge area in the second embodiment.

In the following, the case is explained where the tile of interest is determined to be the edge area (YES at step S430). At step S431, the CPU 201 performs quantization processing for the tile of interest in the full-color image derived at step S310 and derives a bitmap pattern represented by only the two colors of the foreground color and the background color. For the derivation of the bitmap pattern at this step, it may be possible to use any method, such as adaptive binarization processing. By this step, shape information (64-bit data) indicating which pixel corresponds to the foreground pixel and which pixel corresponds to the background pixel of the 8×8 pixels making up the tile of interest is acquired. This shape information is stored in a 64-bit area "map 8×8" at the end of a 128-bit bit pattern shown in FIG. 12.

At step S432, the CPU 201 performs the color reduction processing to reduce the number of tone levels for each of the two colors (16-bit, 3-ch each) to be used in the bitmap pattern derived at step S431. Specifically, each of the foreground color and the background color is represented by 10-bit, 3-ch data, that is, 30-bit data in which each channel of RGB has a 10-bit value. The RGB values of the foreground color after the color reduction processing are stored in areas "fg_r10", "fg_g10", and "fg_b10" of the bit pattern shown in FIG. 12 and the RGB values of the background color after the color reduction processing are stored in areas "bg_r10", "bg_g10", and "bg_b10". As described above, in the first embodiment, by the color reduction processing for the input 16-bit, 3-ch color information, the foreground color is represented by 3-bit data and the background color is represented by 12-bit data. Consequently, in the first embodiment, it is possible to represent the background color in full color but it is not possible to represent the foreground color in full color. In contrast to this, in the present embodiment, it is possible to represent both the foreground color and the background color after the color reduction processing in full color (30-bit data).

Next, the case is explained where the tile of interest is determined to be the solid area (NO at step S430). In this case, at step S435, the CPU 201 derives the sum value for each sub tile by calculating the sum of the pixel value of each pixel for each area of 4×4 pixels (sub tile) obtained by dividing the tile of interest (area of 8×8 pixels) in the full-color image derived at step S310. As a result of totalizing the pixel values of 16 pixels having a value within a value range between 0 and 65535 per channel in the original image, the sub tile comes to have a value within a value range between 0 and 1048560 per channel. As a result of this step, data corresponding to four sub tiles is acquired, the data including four pieces of data of one sub tile that can be represented by 20-bit, 3-ch. This has the same meaning as that a 20-bit, 3-ch value is acquired as the pixel value corresponding to each pixel in an area of 2×2 pixels in a 600 dpi×600 dpi image.

Figure 13:
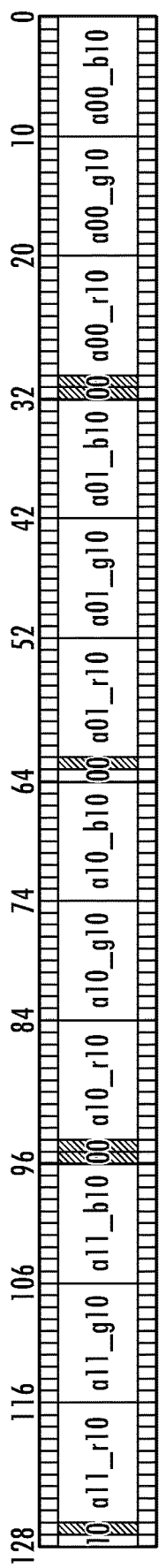
FIG. 13 is a bit pattern of a solid area in the second embodiment.

At step S436, the CPU 201 performs the color reduction processing to reduce the number of tone levels for each of the RGB values (20-bit each) for each sub tile derived at step S435 and derives 10-bit RGB values, respectively. The respective R values of the four sub tiles, which are derived at this step, are stored in respective 10-bit areas "a11_r10", "a10_r10", "a01_r10", and "a00_r10" of the bit pattern shown in FIG. 13. Similarly, the respective G values of the four sub tiles are stored in respective 10-bit areas "a11_g10", "a10_g10", "a01_g10", and "a00_g10" of the bit pattern shown in FIG. 13. Similarly, the respective B values of the four sub tiles are stored in respective 10-bit areas "a11_b10", "a10_b10", "a01_b10", and "a00_b10" of the bit pattern shown in FIG. 13. The four sets of 10-bit, 3-ch information derived at steps S435 and S436 are handled as information on 2×2 pixels in a 600 dpi×600 dpi image at subsequent steps. The above is the contents of the conversion processing in the present embodiment.

As already explained, both the data size of the bit pattern (FIG. 12) that represents the edge area and the data size of the bit pattern (FIG. 13) that represents the solid area are 128 bits. By having different information of the same data size, easy random access is enabled in units of assigned formats and it is possible to improve efficiency of data processing.

In the conversion processing of the present embodiment, in the edge area, the shape is represented with a high resolution at the sacrifice of representing the color with a low resolution. Specifically, the color information on the foreground and the background is shared in units of pixels in a 300 dpi×300 dpi image. On the other hand, in the solid area, it is possible to represent the color of the solid area with a resolution higher than that in the edge area (in units of pixels in a 600 dpi×600 dpi image) at the sacrifice of representing the shape with a low resolution. That is, in the present embodiment also, as in the first embodiment, in the edge area, priority is given to the shape reproduction capability over the color reproduction capability and in the solid area, priority is given to the color reproduction capability over the shape reproduction capability, and at the same time, both the edge area and the solid area are represented by the bit pattern of the same data size.

In the present embodiment, the case is explained where both the color of the foreground pixel and the color of the background pixel are represented by 30-bit data, but it is only required for each of the color of the foreground pixel and the color of the background pixel to be represented in full color and the data that is used is not limited to 30-bit data. That is, it may be possible to appropriately change the bit length of the bit area, which is allocated to the color of the foreground pixel and the color of the background pixel, in accordance with the bit length of the bit pattern that is used.

Third Embodiment

In the first embodiment, in the conversion processing, the edge area and the solid area are represented by the bit patterns in the different formats (FIG. 6B, FIG. 7A). In contrast to this, in the present embodiment, in the conversion processing, the solid area and the edge area are represented by the same bit pattern (FIG. 6B). That is, image data is represented only by the bit pattern shown in FIG. 6B without using the bit pattern shown in FIG. 7A.

Specifically, an area of 4×4 pixels in a 2400 dpi×2400 dpi image is handled as one tile. Then, in the case where a processing-target tile (tile of interest) is determined to be the solid area, the color of the solid area is represented by 10-bit, 3-ch (FIG. 7A) in the first embodiment, but in the present embodiment, the color is represented by 4-bit, 3-ch. This has the same meaning as that the color of the solid area is represented by 4-bit, 3-ch (each channel of RGB is represented in 16 tone levels) in an area of 1×1 pixel in a 600 dpi×600 dpi image. In the present embodiment, gradation properties are guaranteed by performing the color reduction processing (color reduction processing to 16 tone levels) to derive the 4-bit, 3-ch color of the solid area by using the dither method. In the following, differences from the first embodiment are explained mainly and explanation of the same configuration and the same processing as those of the first embodiment is omitted appropriately.

It is known that the visual feature (in particular, the visual transfer function) of a person for a periodic change in luminance can identify a slight change in luminance in a low-frequency image but can identify only a large change in luminance in a high-frequency image.

Figure 14:
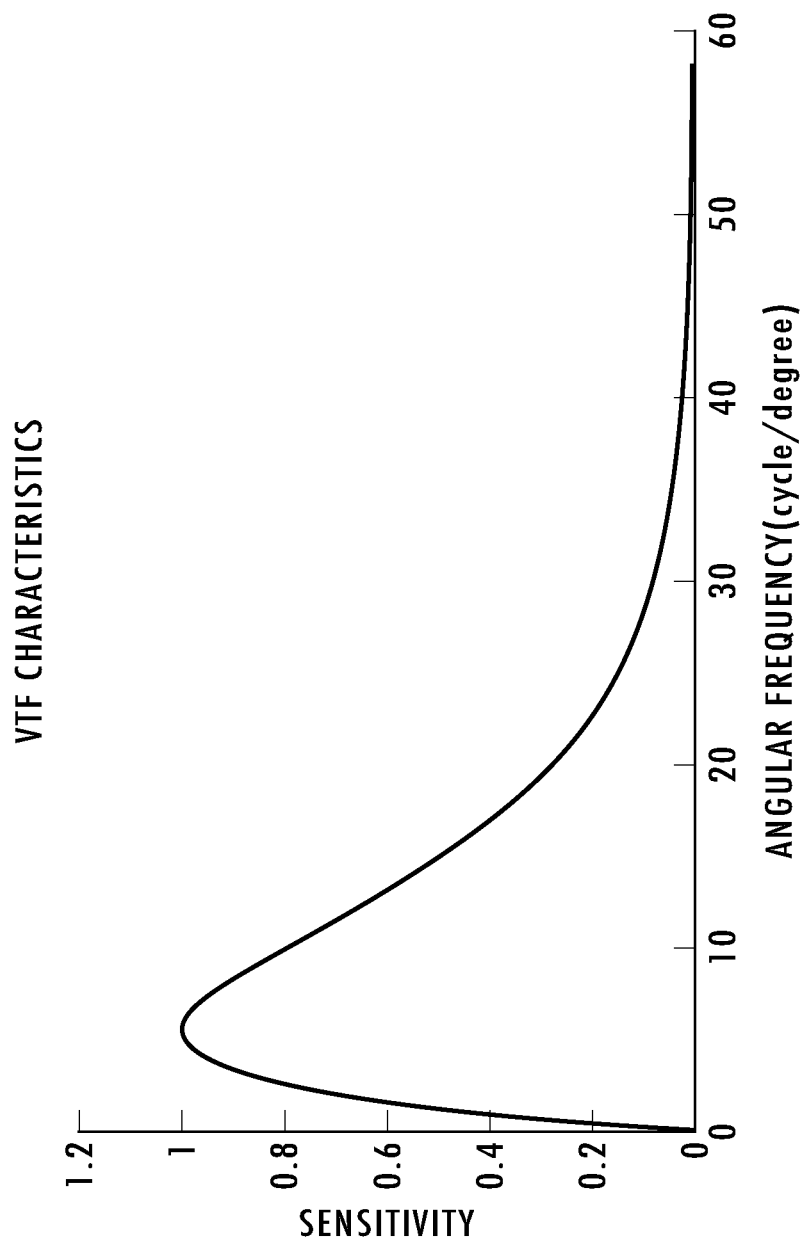
FIG. 14 is a diagram showing VTF characteristics.

FIG. 14 shows a relationship (VTF curve) between the sensitivity of a person, which is the ability to identify a change in gradation, and the frequency. In the case where the number of tone levels in an image exceeds this VTF curve, it can be said that the number of tone levels is sufficient.

In the following, the case is discussed as an example where 600 dpi×600 dpi image data (each pixel is represented in 16 tone levels) is created by dither. Here, one pixel in 300 dpi×300 dpi image data corresponds to 2×2 pixels in 600 dpi×600 dpi image data. Further, one pixel in 150 dpi×150 dpi pixel data corresponds to 4×4 pixels in 600 dpi×600 dpi image data. It is possible for each pixel in 600 dpi×600 dpi image data to represent 16 values of 0 to 15, and therefore, it is possible for one pixel in 300 dpi×300 dpi image data to represent 61 values of 0 to 60 (=15×4) by using four pixels in 600 dpi×600 dpi image data. Similarly, it is possible for one pixel in 150 dpi×150 dpi image data to represent 241 values of 0 to 240 (=15×16) by using 16 pixels in 600 dpi×600 dpi image data. To generalize the contents described previously, in the case where 600 dpi is taken as a reference, with X dpi, (15×(600/X)^2+1) tone levels can be represented. That is, in the area gradation, finer gradation representation is enabled at the sacrifice of a reduction in resolution.

Figure 15:
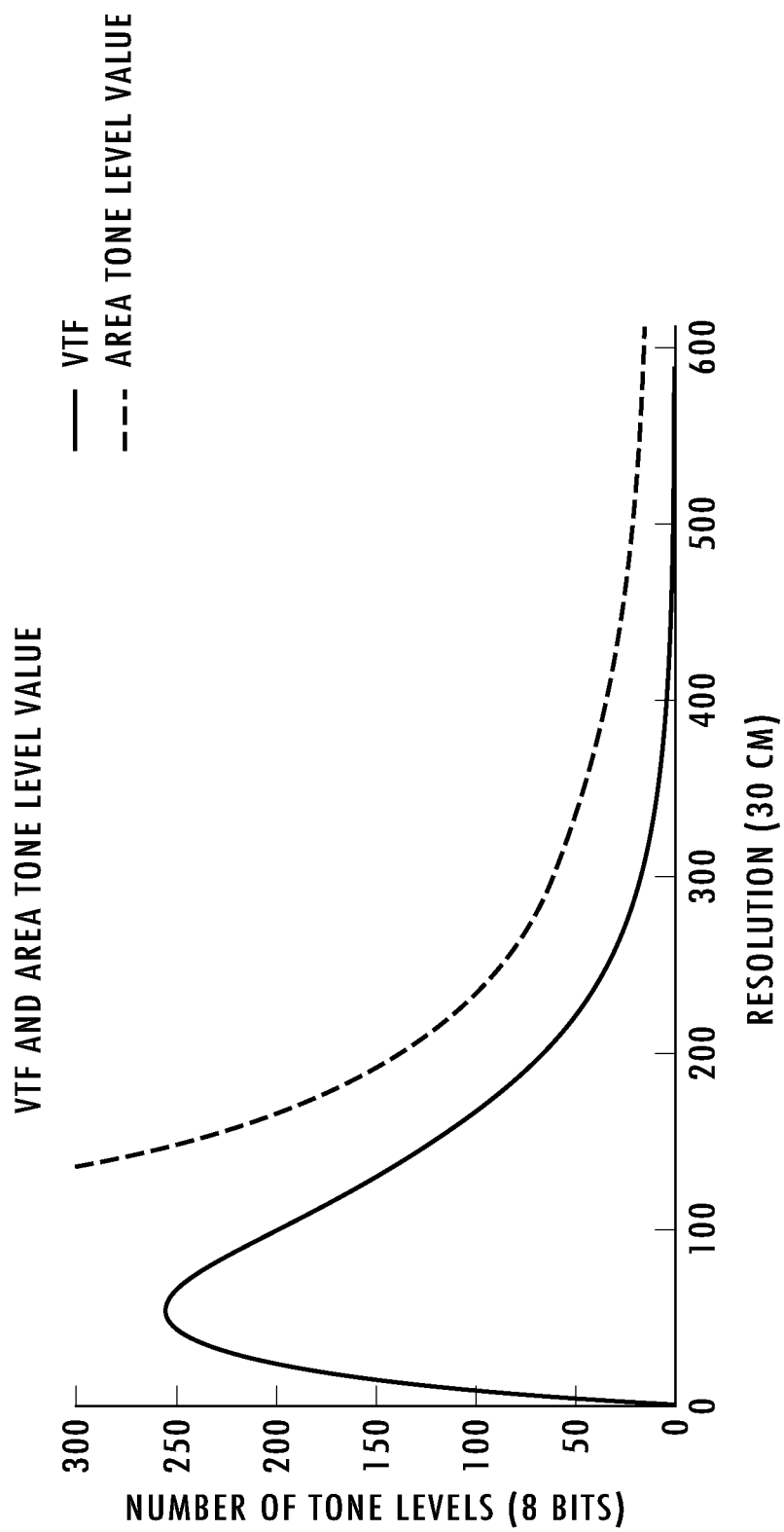
FIG. 15 is a diagram explaining color reduction processing that is performed by using a dither method in a third embodiment.

FIG. 15 shows a graph obtained by plotting a relationship between the value of the area gradation by dither and the frequency in FIG. 14 with the above in mind. As shown in FIG. 15, the value of the area gradation by dither exceeds the number of tone levels (number of tone levels indicated by the VTF curve) that a person can identify at each resolution, and therefore, it is known that sufficient gradation properties are obtained by using the area gradation by dither. By making use of this, in the present embodiment, only the format shown in FIG. 6B is used.

<About Conversion Processing>

In the following, the conversion processing (step S320 in FIG. 3) in the present embodiment is explained by using FIG. 4. The present embodiment differs from the first embodiment only in the color reduction processing at step S436.

At step S436, the CPU 201 performs the color reduction processing to reduce the number of tone levels for each of the RGB values (20-bit each) derived at step S435 and derives 4-bit RGB values, respectively. Here, in the present embodiment, the color reduction processing is performed by using the dither method. It may also be possible to perform the color reduction processing by using the error diffusion method in place of performing the color reduction processing by using the dither method. The reason is as follows.

In the first embodiment, the color of the solid area is represented by a sufficient number of bits (10-bit, 3-ch) (FIG. 7A). On the other hand, in the present embodiment, the color of the solid area is represented by 4-bit, 3-ch (FIG. 6B). In the case where the color reduction processing to derive information on the color of the solid area is performed by using the dither method, there is a possibility that trouble occurs. For example, in the case where quantization processing at subsequent step S924 is performed by using the dither method, the dither processing is performed a plurality of times for the same area, and therefore, the feeling of granularity worsens due to the interference between dither patterns. Consequently, by performing the color reduction processing by using the error diffusion method, the occurrence of interference can be avoided. Alternatively, it may also be possible to set patterns in advance so that the dither pattern that is used in the color reduction processing and the dither pattern that is used in the quantization processing do not interfere with each other at the time of using the dither method.

The 4-bit, 3-ch color information derived by the color reduction processing is stored in the 12-bit area "bg_rgb" of the bit pattern shown in FIG. 6B. Further, for all the bits in the area "map_4×4", 0 is stored as a value indicating that the pixel is the background pixel. In the area "fg_rgb", the color information on the foreground is stored in the first embodiment, but in the present embodiment, the information is not referred to, and therefore, it may be possible to store any value, such as an indefinite value.

Figure 9:
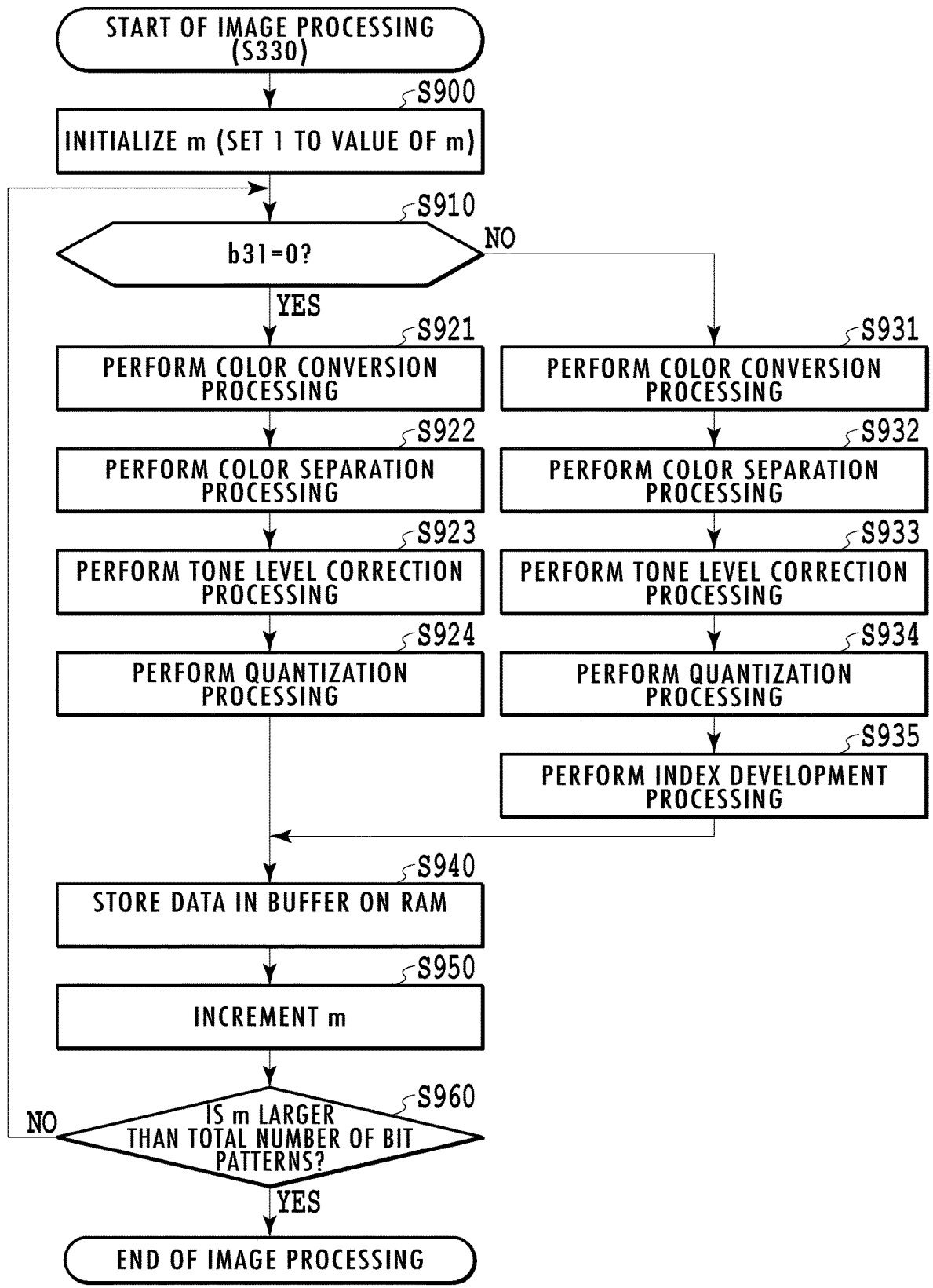
FIG. 9 is a flowchart of image processing in the first embodiment.

By the present embodiment, because the bit pattern similar to that of the edge area is created also for the solid area, it is no longer necessary to perform the processing at step S931 to step S935 in FIG. 9, and therefore, it is possible to simplify the image processing apparatus within the printer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is possible to implement a bit pattern capable of specifying a plurality of colors while storing information on a shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244554, filed Dec. 16, 2016, which is hereby incorporated by reference wherein in its entirety.

What is claimed is:

1. An image processing apparatus comprising:
   at least one CPU and at least one memory, wherein the at least one CPU according to a program stored in the at least one memory is configured to function as:
   an obtaining unit configured to obtain image data corresponding to image area of a predetermined size which corresponds to predetermined number of pixels;
   a determining unit configured to determine at least one foreground pixel, and further configured to determine background pixels, a color of the at least one foreground pixel, and a color of background pixels, within the image area based on the image data obtained by the obtaining unit;
   a creation unit configured to create, based on pixel values of the pixels of the obtained image data, bit pattern data of predetermined bits in a predetermined data format including bits for shape information on a shape of an image of the image area in which the bits correspond to the respective pixels within the image area and indicate either the foreground pixel determined by the determining unit or a background pixel determined by the determining unit, and bits for color information on a color of the image of the image area, which specify the color of the at least one foreground pixel by at least one bit and the color of the background pixels by bits more than the at least one bit used for the at least one foreground pixel.

2. The image processing apparatus according to claim 1, wherein
the number of bits of the bit pattern data is smaller than the number of bits of data of all pixels within the image area.

3. The image processing apparatus according to claim 1, wherein the at least one CPU according to a program stored in the at least one memory is configured to further function as:
a shape information derivation unit configured to derive the shape information by performing quantization processing for a pixel value of the respective pixels within the image area.

4. The image processing apparatus according to claim 3, wherein the at least one CPU according to a program stored in the at least one memory is configured to further function as:
a color information derivation unit configured to derive the color information.

5. The image processing apparatus according to claim 4, wherein
the quantization processing is binarization processing.

6. The image processing apparatus according to claim 5, wherein
the color information derivation unit performs color reduction processing to reduce a number of tone levels of a color of the foreground pixel and a color of the background pixel.

7. The image processing apparatus according to claim 6, wherein
the color reduction processing is performed by using a dither method or an error diffusion method.

8. The image processing apparatus according to claim 5, the number of bits of the information on a color of the background pixel is larger than the number of bits the information on a color of the foreground pixel in the bit pattern data.

9. The image processing apparatus according to claim 1, further comprising:
an obtaining unit obtains a plurality of pieces of image data corresponding to respective image areas each having the predetermined size wherein,
the creation unit creates the bit pattern data for the respective image areas.

10. The image processing apparatus according to claim 1, wherein the at least one CPU according to a program stored in the at least one memory is configured to further function as:
a deriving unit configured to derive edge information indicating whether the image area of interest corresponds to an edge of an object based on the image data corresponding to the image area obtained by the obtaining unit,
and wherein in a case where the edge information indicates that the image area of interest corresponds to an edge of an object, the determining unit determines the at least one foreground pixel and the background pixels.

11. The image processing apparatus according to claim 1, wherein the at least one CPU according to a program stored in the at least one memory is configured to further function as:
a deriving unit configured to derive edge information indicating whether the image area of interest corresponds to an edge of an object based on the image data corresponding to the image area obtained by the obtaining unit,
and wherein in a case where the edge information indicates that the image area of interest does not correspond to an edge of an object, the determining unit does not determine the at least one foreground pixel, and the creation unit creates the bit pattern data specifying color of the image area using more bits than bits used for specifying the color of the background pixels in the predetermined data format.

12. An image processing method comprising:
a step of obtaining image data corresponding to image area of a predetermined size which corresponds to predetermined number of pixels;
a step of determining at least one foreground pixel, and of determining background pixels, a color of the at least one foreground pixel, and a color of background pixels, within the image area based on the image data obtained by the obtaining step;
a step of creating, based on pixel values of the pixels of the obtained image data, bit pattern data of predetermined bits in a predetermined data format including bits for shape information on a shape of an image of the image area in which the bits correspond to the respective pixels within the image area and indicate either the foreground pixel determined by the determining step or the background pixel determined by the determining step, and bits for color information on a color of the image of the image area, which specify the color of the at least one foreground pixel by at least one bit and the color of the background pixels by bits more than the at least one bit used for the at least one foreground pixel.

13. The image processing method according to claim 12, wherein
the number of bits of the bit pattern data is smaller than the number of bits of data of all pixels within the image area.

14. The image processing method according to claim 12, further comprising:
a step of deriving the shape information by performing quantization processing for a pixel value of the respective pixels within the image area.

15. The image processing method according to claim 14, further comprising:
a step of deriving the color information.

16. The image processing method according to claim 15, wherein
the quantization processing is binarization processing.

17. The image processing method according to claim 16, wherein
in the step of deriving the color information, color reduction processing to reduce a number of tone levels of a color of the foreground pixel and a color of the background pixel is performed.

18. The image processing method according to claim 17, wherein
the color reduction processing is performed by using a dither method or an error diffusion method.

19. The image processing apparatus according to claim 16,
the number of bits of the information on a color of the background pixel is larger than the number of bits the information on a color of the foreground pixel in the bit pattern data.

20. The image processing method according to claim 12, further comprising:
a step of obtaining a plurality of pieces of image data corresponding to respective image areas each having the predetermined size wherein, in the step of creating, the bit pattern data for the respective image areas are created.

21. The image processing method according to claim 12, further comprising:
a step of deriving edge information indicating whether the image area of interest corresponds to an edge of an object based on the image data corresponding to the image area obtained in the step of obtaining image data, and wherein in a case where the edge information indicates that the image area of interest corresponds to an edge of an object, the at least one foreground pixel and the background pixels are determined in the step of determining.

22. The image processing method according to claim 12, further comprising:
a step of deriving edge information indicating whether the image area of interest corresponds to an edge of an object based on the image data corresponding to the image area obtained in the step of obtaining image data, and wherein in a case where the edge information indicates that the image area of interest does not correspond to an edge of an object, the at least one foreground pixel is not determined in the step of determining, and the bit pattern data, which specifies color of the image area using more bits than bits used for specifying the color of the background pixels in the predetermined data format, is created in the step of creating bit pattern data.

23. A non-transitory computer readable storage medium storing a program for causing a computer to perform an image processing method comprising:
a step of obtaining image data corresponding to image area of a predetermined size which corresponds to predetermined number of pixels;
a step of determining at least one foreground pixel, and of determining background pixels, a color of the at least one foreground pixel, and a color of background pixels, within the image area based on the image data obtained by the obtaining step;
a step of creating, based on pixel values of the pixels of the obtained image data, bit pattern data of predetermined bits in a predetermined data format including bits for shape information on a shape of an image of the image area in which the bits correspond to the respective pixels within the image area and indicate either the foreground pixel determined by the determining step or the background pixel determined by the determining step, and bits for color information on a color of the image of the image area, which specify the color of the at least one foreground pixel by at least one bit and the color of the background pixels by bits more than the at least one bit used for the at least one foreground pixel.

* * * * *